United States Patent [19]
Koizumi et al.

[11] Patent Number: 4,732,577
[45] Date of Patent: Mar. 22, 1988

[54] PROCESS FOR SEPARATING CARBON MONOXIDE HAVING SUBSTANTIALLY CONSTANT PURITY

[75] Inventors: Susumu Koizumi, Kurashiki; Shigeo Matsui, Kobe; Kyoichi Kawata, Takaishi, all of Japan

[73] Assignees: Osaka Sanso Kogyo Ltd.; Kawasaki Steel Corp., both of Japan

[21] Appl. No.: 38,696

[22] Filed: Apr. 14, 1987

[30] Foreign Application Priority Data

Apr. 14, 1986 [JP] Japan .................................. 61-84236

[51] Int. Cl.⁴ .............................................. B01D 53/04
[52] U.S. Cl. .......................................... 55/18; 55/25; 55/58; 55/68; 55/74; 55/75
[58] Field of Search ................... 55/18, 25, 26, 58, 62, 55/68, 74, 75

[56] References Cited

U.S. PATENT DOCUMENTS

| | | | |
|---|---|---|---|
| Re. 31,014 | 8/1982 | Sircar | 55/26 |
| 3,085,379 | 4/1963 | Kiyonaga et al. | 55/58 X |
| 3,717,974 | 2/1973 | Batta | 55/58 |
| 3,897,226 | 7/1975 | Doherty | 55/62 X |
| 4,315,759 | 2/1982 | Benkmann | 55/18 |
| 4,323,370 | 4/1982 | Leitgeb | 55/18 |
| 4,468,238 | 8/1984 | Matsui et al. | 55/26 |
| 4,512,780 | 4/1985 | Fuderer | 55/62 X |
| 4,539,019 | 9/1985 | Koch | 55/58 X |
| 4,539,020 | 9/1985 | Sakuraya et al. | 55/26 |
| 4,566,881 | 1/1986 | Richter et al. | 55/58 X |

FOREIGN PATENT DOCUMENTS

| | | | |
|---|---|---|---|
| 3006836 | 9/1981 | Fed. Rep. of Germany | 55/18 |
| 20267 | 2/1980 | Japan | 55/62 |
| 602210 | 2/1978 | U.S.S.R. | 55/18 |

*Primary Examiner*—Robert Spitzer
*Attorney, Agent, or Firm*—R. Hain Swope; Larry R. Cassett

[57] ABSTRACT

There is provided an improved process for forming high purity carbon monoxide wherein a product of substantially uniform purity is obtained. A waste gas containing at least CO, $CO_2$ and $N_2$ is treated by pressure swing adsorption in two stages to remove $CO_2$ and CO, respectively. The CO content of at least the feed gas and the second stage product gas are monitored and an amount of second stage product gas is recycled to the feed gas and/or the first stage product gas sufficient to assure substantially uniform CO content in the second stage product gas withdrawn from the system.

7 Claims, 5 Drawing Figures

PROCESS FOR SEPARATING CARBON MONOXIDE HAVING SUBSTANTIALLY CONSTANT PURITY

The present invention relates to a process for obtaining carbon monoxide having substantially constant purity from a feed gas containing at least carbon dioxide, carbon monoxide and nitrogen, such as waste gases from a converter furnace or a blast furnace, by pressure swing adsorption (PSA). The carbon monoxide recovered according to the present invention can be used as a raw material for chemical processes.

BACKGROUND OF THE INVENTION

A process for separating carbon monoxide from a feed gas containing CO, $CO_2$ and $N_2$ by using PSA in a two-stage adsorption process is disclosed in U.S. Pat. No. 4,539,020 dated Sept. 3 1985 by Sakuraya et al. According to the process disclosed therein, as the concentration of CO in the feed gas changes, the concentration of CO in the product gas also changes.

A problem in using waste gas from a converter furnace as a starting material for a chemical process is that the concentration of CO in the waste gas changes with time. Therefore, it is difficult to continously obtain a Product having a substantially constant concentration of CO. The converter waste gas typically contains CO in a concentration of from about 70 to 80%. From this gas, CO with a purity of about 98% can be produced. However, the concentration of CO in the converter gas will sometimes fall to about 50% and the purity of CO in the product gas will correspondingly fall to 96-97%. Where the product gas is utilized directly in a chemical process, such a drop in the concentration of CO therein may result in a stoppage of the reactor. If, on the other hand, the apparatus is designed to utilize the lowest concentration of CO typically found in waste gases, e.g. 50%, a significant amount of power will be wasted when the feed contains typical levels of 70-80% CO.

SUMMARY OF THE INVENTION

In accordance with this invention carbon monoxide is obtained in substantially constant purity from a feed gas containing at least carbon dioxide, carbon monoxide and nitrogen through pressure swing adsorption (PSA) in a two-stage process comprising:

(1) pressure swing adsorption preferably using at least two adsorption columns to remove carbon dioxide from said feed gas; and (2) separating carbon monoxide from the gaseous mixture which has been withdrawn from the first adsorption stage through PSA preferably using at least two adsorption columns, wherein the CO concentration in at least the feed gas and the effluent product gas withdrawn from the second adsorption stage are monitored, and when the CO concentration in the feed gas or effluent gas decreases below a predetermined level, part of the CO product gas is circulated into the feed gas, the effluent gas from the first adsorption step, or both gases. There is thus-obtained carbon monoxide of substantially constant purity regardless of the CO concentration in the feed gas.

DESCRIPTION OF THE PREFERRED EMBODIMENT

The process of obtaining carbon monoxide of substantially constant purity in accordance with this invention is carried out in two stages as follows:

In the first stage, a feed gas, such as a converter furnace or blast furnace waste gas, is pressurized and introduced into a column containing an adsorbent material which will adsorb carbon dioxide. In a second step, the column is depressurized to about atmospheric pressure, typically in equalization with one or more additional columns. In a third step, the column is evacuated, preferably countercurrently, to between about 60 and 300 Torr. The column is then purged with waste gas from the second stage as will be described hereafter. The column is repressurized, preferably with product gas from the first stage, and the process repeated. These steps are carried out with at least two adsorbent columns which are in alternate cycle, i.e. the first column is being regenerated while a second is being put into the adsorption stage. In stage two, the effluent from the first stage PSA separation, which contains CO, a trace of $CO_2$, nitrogen, hydrogen and oxygen, is introduced into a column containing an adsorbent which will adsorb CO. The column is subjected to pressure equalization and purge steps as in the first stage after which the column is evacuated to recover carbon monoxide. Product gas is utilized as the purge gas and is introduced into another column for CO recovery. As is the case with stage one, two or more columns are utilized and are cycled in a complimentary manner as is conventional in PSA techniques, i.e. a first column is in production while a second is undergoing regeneration.

Figure 1:
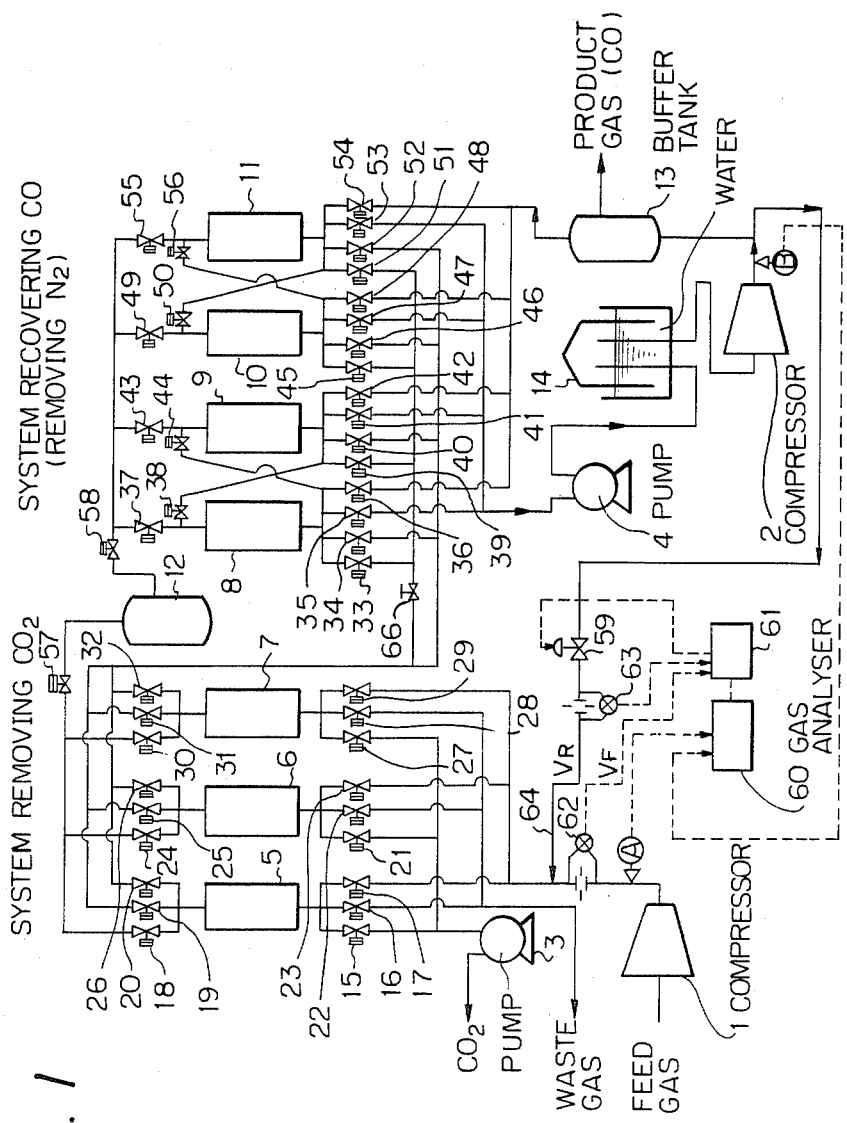
FIGS. 1-3 are flowsheets showing preferable forms of apparatus for this invention.
Figure 2:
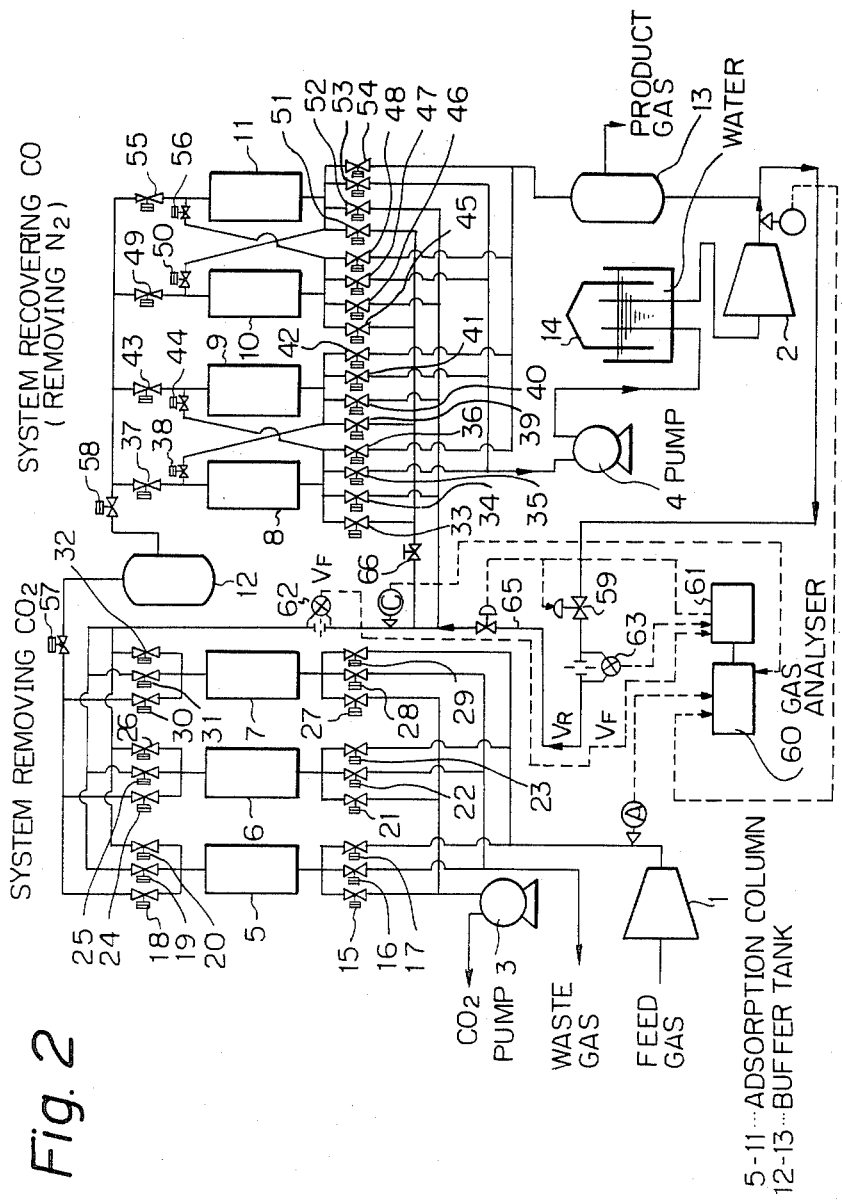
Figure 3:
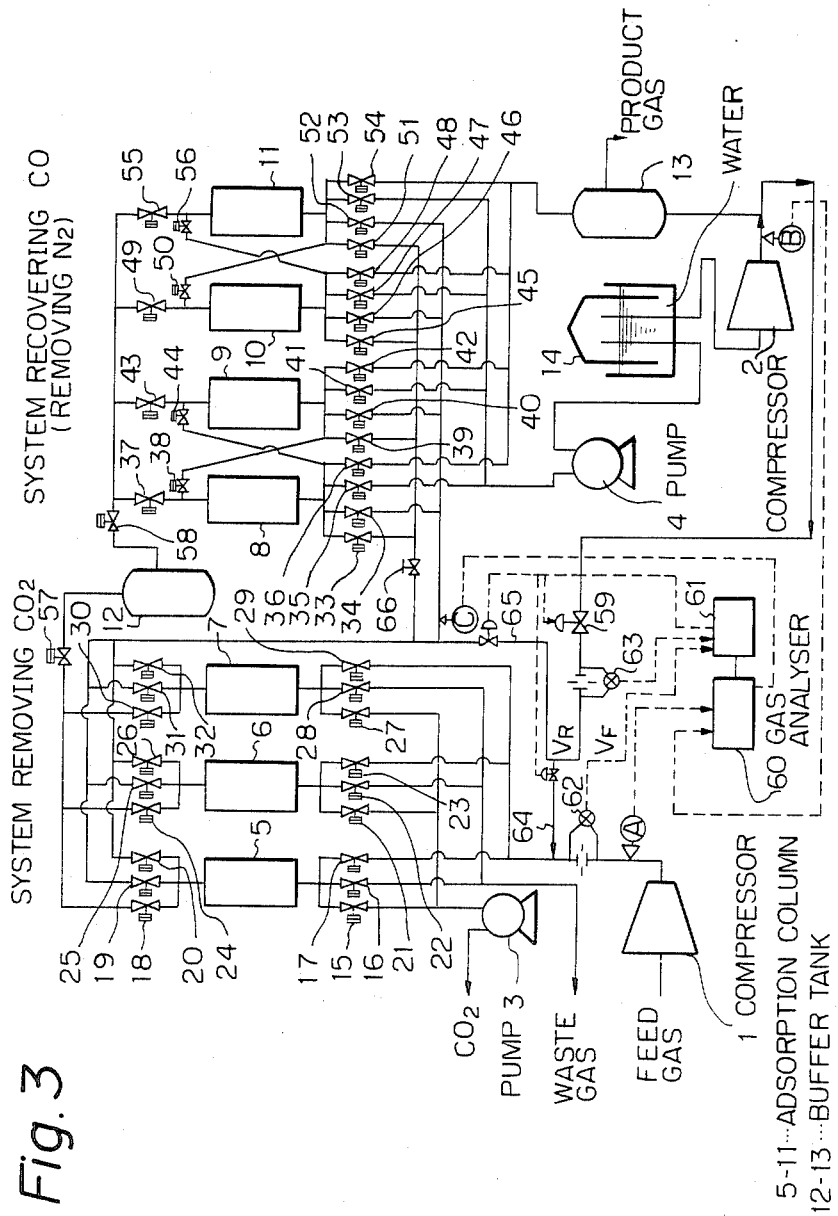

Two basic means of carrying out the process of this invention are illustrated in FIG. 1 and FIGS. 2 and 3, respectively. They will be discussed collectively pointing out the differences where applicable. In FIG. 1, each of the adsorption columns 5, 6 and 7 is filled with an adsorbent material which is capable of selectively adsorbing $CO_2$, e.g. activated alumina and carbon. One of the columns, e.g. column 5, is in the stage of adsorption and has been pressurized to a predetermined adsorption pressure. Valve 17 is open and the feed gas that has been pressurized in compressor 1 passes into column 5 for adsorption of $CO_2$. A part of the CO and other gases in the feed gas is adsorbed by the adsorbent and the remainder goes out of the opposite end of the column 5 and flows past the valve 20 into the second stage PSA apparatus for CO removal which comprises adsorption columns 8-11. In this instance, valves 15, 16, 18, and 19 are all closed. After the adsorption step has been carried out for a certain predetermined period of time or for a certain predetermined volume of feed gas, valves 17 and 20 are closed and valve 16 is opened so that the pressure in the column 5 will be decreased to near-atmospheric pressure.

When near-atmospheric pressure is attained in the column 5, valve 16 is closed and the column is evacuated through valve 15 with a vacuum pump 3 so as to desorb the $CO_2$ component from the adsorbent. Evacuation is typically carried out at a pressure of 80-120 Torr, preferably at 100 Torr. After the evacuation step has been completed, valves 18 and 57 are opened and the exhaust or waste gas from columns 8–11 is used as a purge gas for desorbing any residual $CO_2$ from the adsorbent. After this purge step, valves 18, 15 and 57 will be closed.

In the next step, valve 19 is opened and the column 5 is pressured to the necessary adsorption pressure with the product gas from columns 5–7. If pressurization of the product gas is being effected in column 5, the product gas used for pressurization purposes is supplied from column 7 which is in the stage of adsorption. After the pressurizing step, valve 19 is closed. By cyclically repeating the above procedures in the individual adsorption columns, $CO_2$ in the feed gas can be efficiently and continuously removed. As will be appreciated from FIGS. 1–3, valves 21–26 and 27–32 function as described with reference to valves 15–20 in cyclic repetitions of the process utilizing beds 6 and 7.

The feed gas that has been freed of $CO_2$ in the first adsorption stage is then introduced into the second stage to remove nitrogen and other gases which may be present, typically hydrogen and oxygen, thereby obtaining concentrated carbon monoxide. Each of the adsorption columns 8, 9, 10 and 11 used in this second stage is filled with an adsorbent that is capable of selective adsorption of CO (and trace amounts of $CO_2$) such as activated alumina and zeolite. After evacuating a column, e.g. column 8, with a vacuum pump 4, the gas leaving the PSA apparatus in the first stage is introduced therein through a valve 33. Valve 66 serves to control the rate of pressurization of column 8. After this pressurization step, valves 34 and 37 are opened while valve 33 is closed to allow the gas leaving the PSA apparatus to be passed through column 8. The readily adsorbable CO and trace $CO_2$ are adsorbed on the adsorbent in column 8 while the other gases pass through the column to fill a buffer tank 12 through valve 58. When the step of purging the PSA apparatus for $CO_2$ removal is started, the gas in the buffer tank 12 is introduced past valve 57 into the columns in the PSA apparatus for $CO_2$ removal. After the adsorption step has been carried out for a certain period of time or for a certain gas volume, valves 34 and 37 are closed and valve 38 connecting to column 9 is opened so as to reduce the pressure in column 8 to a predetermined superatmospheric pressure and to have the released gas adsorbed on the adsorbent in the column 9. When a predetermined pressure is attained in the column 8, the valve 38 is closed. Valves 36 and 38 are then opened and a purge gas for displacing the difficult-to-adsorb components in the voids in the column 8 is introduced into the column from the product gas buffer tank 13. After passing through column 8, the purge gas flows through valve 38 to be recovered in the adjacent column 9. After the purge step, valves 36 and 38 are closed and valve 35 opened so that the column 8 is evacuated with pump 4 to desorb the readily adsorbable components from the adsorbent. Evacuation is performed down to a pressure of 100 Torr and the readily adsorbable CO is recovered as the product gas. The recovered gas is fed to a water-filled gas holder 14 from which it is transferred to the product gas buffer tank 13 after it has been pressurized with a compressor 2. Part of the gas in the tank 13 is sent to the second stage PSA apparatus as a purge gas, while the remainder is withdrawn as the product gas.

After the evacuation step, valve 35 is closed and the valve 44 on column 9 is opened so that the gas released from column 9 will be adsorbed by column 8. After the depressurization step, valve 44 is closed. This valve will be re-opened when the column 9 is ready for purging and the purge gas from the column 9 will be introduced into the column 8.

By cyclically repeating the above procedures in the individual adsorption columns, the difficult-to-adsorb CO gas can be continously removed through adsorption on the adsorbent. As will be apreciated from FIGS. 1–3, valves 39–43, and 45–56 function as described with reference to valves 33–38 and 44 in cyclic repetitions of the process utilizing beds 9–11.

In accordance with the present invention sampling is performed at point A on the initial feed gas conduit and on the product gas exiting the compressor 2. The concentrations of CO in the samples are determined by a gas analyzer 60 and fed into a computing controller 61 which will calculate the amount of return gas to be mixed with the feed gas in the apparatus illustrated in FIG. 1 or with the feed gas and/or the stage one product gas in the apparatus illustrated in FIGS. 2 and 3. At the same time, the flow rate of the feed gas and/or the product from the first stage of purification is measured with a flow meter 62 and the resulting signal $V_F$ is also fed into the computing controller 61. The controller 61 performs the necessary calculation to determine the amount of product gas will be returned into the feed gas through conduit 64 and/or into the product gas from the first stage of purification through conduit 65. In other words, part of the product gas from the second stage of purification is returned to the system via conduits 64 and/or 65 to assure a sufficiently high initial CO concentration so that a product substantially uniform in CO is produced on a continuous basis. The cumulative amount of the product gas being returned is monitored by return gas flow meter 63 and upon reaching a predetermined level, valve 59 is closed thus ceasing the flow.

In the embodiment shown in FIG. 1, analysis is made at points A and B and product gas is added to the initial feed gas to achieve a desired level of CO therein. The amount of product gas to be returned to assure that the purity of the product gas can be constantly held at a predetermined level without changing operating conditions of the adsorption columns is calculated by the following equation:

$$V_R = \frac{A_{Fd} - A_{Ff}}{A_p - A_{Fd}} \times V_F$$

wherein: $V_R$ is the amount of product gas to be returned (Nm³/hr); $A_{Fd}$ is the design CO concentration of the feed gas, i.e. the designated operating capacity of the system; $A_{Ff}$ is the measured CO concentration of the feed gas; $A_p$ is the CO concentration of the product gas; and $V_F$ is the mean value of the transfer of feed gas (Nm³/hr). Typically, the system will be designed to recycle product gas when the CO concentration in the feed gas falls below about 70%.

Since the product gas from the first stage of purification is essentially the same as the feed gas except that the former is free of $CO_2$ content, the above equation can be used for the purpose of concentration control regardless of whether the return gas is mixed with the feed gas or with the product gas from the first stage of purification as in the apparatus illustrated in FIGS. 2 and 3.

In the embodiment shown in FIG. 2, the return gas is mixed with the product gas from the first stage of purification and the flow rate of the product gas ($V_{Fl}$) and the CO concentration thereof can be calculated from the following equation:

$$V_R = \frac{A_{Fdl} - A_{Ff}}{A_p - A_{Fdl}} \times V_{Fl}$$

wherein the remaining designations are as in the previous equation. In the embodiment shown in FIG. 3 product gas may be reintroduced into both the initial feed line and the product gas from the first stage of purification. In the embodiments shown in FIGS. 2 and 3, an additional gas analysis is made at points C in the effluent from the first stage.

Figure 4:
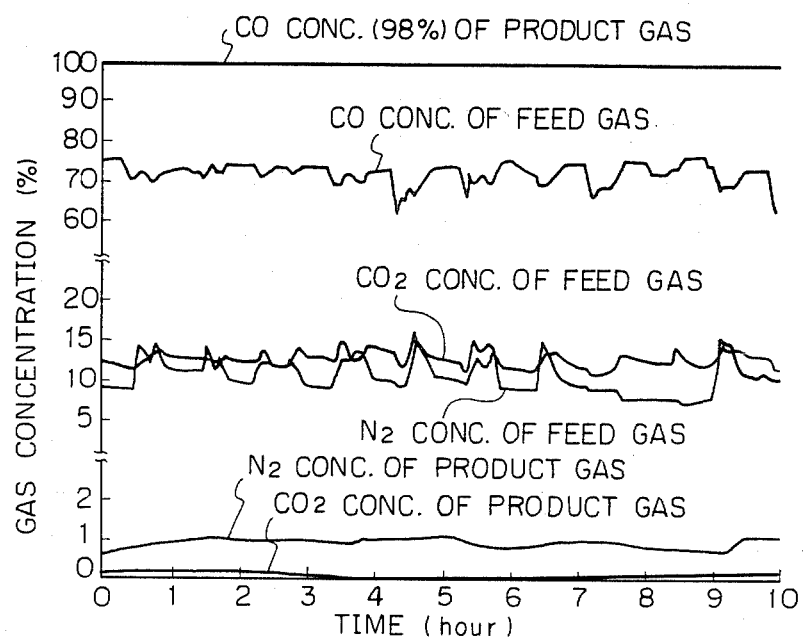
FIG. 4 is a graph showing changes in the amounts of CO, $CO_2$ and $N_2$ with time.
Figure 5:
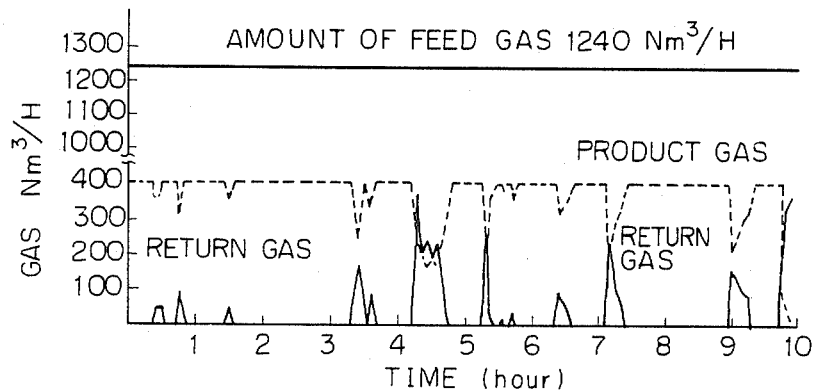
FIG. 5 is a graph showing changes in the amount of product gas with time.

FIG. 4 shows the profile of variation in $A_{Ff}$, $A_p$, $V_R$ and $V_P$ (the amount of product gas) that occurred when the first embodiment of the process of the present invention shown in FIG. 1 was practiced. It can be readily appreciated from FIG. 4 that the present invention enabled a feed gas having a design concentration ($A_{Fd}$) of 71% CO to be purified to yield a product gas having a purity ($A_p$) of 98% CO. Equal results could be attained by performing the process of the present invention in accordance with its second embodiment shown in FIG. 2 and its third embodiment shown in FIG. 3.

The present invention has been described with reference to preferred embodiments thereof. It will be apparent to those skilled in the art that modifications and variations can be made in the details utilized to represent the invention without departing from the spirit and scope thereof.

What is claimed:

1. A process for obtaining a product gas stream having an enriched and substantially uniform concentration of carbon monoxide from a feed gas containing at least carbon dioxide, carbon monoxide and nitrogen comprising:
   (a) subjecting said feed gas to pressure swing adsorption to substantially remove carbon dioxide therefrom and form a first stage product gas containing at least carbon monoxide and nitrogen;
   (b) subjecting said first stage product gas to pressure swing adsorption to form a second stage product gas comprising carbon monoxide, wherein the level of carbon monoxide is continuously determined in at least the feed gas and the product gas and an amount of second stage product gas is added to the feed gas, the first stage product gas or both sufficient to maintain a substantially uniform carbon monoxide level in said second stage product gas.

2. A process in accordance with claim 1, wherein the carbon monoxide level is also determined in said first stage product gas.

3. A process in accordance with claim 2, wherein second stage product gas is added to said feed gas 4. A process in accordance with claim 2, wherein second stage product gas is added to said feed gas and said first stage product gas.

5. A process in accordance with claim 1, wherein second stage product gas is added to said feed gas.

6. A process in accordance with claim 1, wherein said feed gas is waste gas from a converter furnace.

7. A process in accordance with claim 1, wherein said feed gas is waste gas from a blast furnace.

* * * * *